US008452782B2

(12) United States Patent
Ishikawa et al.

(10) Patent No.: US 8,452,782 B2
(45) Date of Patent: May 28, 2013

(54) TEXT MINING DEVICE, TEXT MINING METHOD, TEXT MINING PROGRAM, AND RECORDING MEDIUM

(75) Inventors: Kai Ishikawa, Tokyo (JP); Akihiro Tamura, Tokyo (JP); Shinichi Ando, Tokyo (JP)

(73) Assignee: NEC Corporation, Tokyo (JP)

( * ) Notice: Subject to any disclaimer, the term of this patent is extended or adjusted under 35 U.S.C. 154(b) by 193 days.

(21) Appl. No.: 12/919,463

(22) PCT Filed: Mar. 6, 2009

(86) PCT No.: PCT/JP2009/054300
§ 371 (c)(1),
(2), (4) Date: Aug. 25, 2010

(87) PCT Pub. No.: WO2009/113457
PCT Pub. Date: Sep. 17, 2009

(65) Prior Publication Data
US 2011/0010373 A1     Jan. 13, 2011

(30) Foreign Application Priority Data
Mar. 12, 2008  (JP) .................................. 2008-062667

(51) Int. Cl.
G06F 17/30         (2006.01)
(52) U.S. Cl.
USPC .......................................... 707/749; 707/776
(58) Field of Classification Search
USPC .................................................. 707/749, 776
See application file for complete search history.

(56) References Cited

U.S. PATENT DOCUMENTS

2007/0179984 A1 * 8/2007 Watanabe ..................... 707/200

FOREIGN PATENT DOCUMENTS

| JP | 8-180057 A | 7/1996 |
|---|---|---|
| JP | 2001266060 A | 9/2001 |
| JP | 2006286026 A | 10/2006 |

OTHER PUBLICATIONS

International Search Report for PCT/JP2009/054300 mailed Apr. 7, 2009.
Y. Ueda et al., "Supporting of Document Revising in Organization by Using the Association Rule", The Transactions of the Institute of Electronics, Information and Communication Engineers. vol. J85-D-1, No. 7, Jul. 2002, pp. 681-690.
T. Matsunaga et al., "Sentence Matching Algorithm of Revised Documents with Considering Context Information", IEICE Technical Report, NLC2003-22, vol. 103, No. 280, Aug. 2003. pp. 43-48.
A. Tamura et al., "Using Differential Text Mining to Analyze Speech Dialogues and Call-memos in a Call", FIT2008 (The 7th Forum on Information Technology) Koen Ronbunshu, E-066, Aug. 20, 2008, pp. 295-298.

* cited by examiner

*Primary Examiner* — Belix M Ortiz Ditren

(57) ABSTRACT

Provided is a text mining device that performs an analysis properly with respect to a difference between plural related document data. Equipped are an element extracting section 140 that extracts language elements from related two or more document data respectively; a differential processing section 150 that extracts a difference between the document data by comparing the elements between the document data which were extracted by the element extracting means 140; and a statistical processing section 170 that performs statistical processing on the difference extracted by the differential processing section 150. The differential processing section 150 has: element associating section 151 that associates respective elements which are in identical, similar, synonymous, or analogous relation by comparing the elements of the document data between the document data which were extracted by the element extracting section 140; and differential element extracting section 152 that extracts an element with no corresponding element of a pair in the association by the element association section 151.

18 Claims, 26 Drawing Sheets

Fig. 3

RECEPTION INDEX = 25361

| REMARK INDEX | SPEAKER | REMARK TEXT |
|---|---|---|
| 1 | OPERATOR | THANK YOU VERY MUCH. |
| 2 | OPERATOR | THIS IS YAMADA. I AM IN CHARGE OF MARUTOKU ELECTRICS TELEPHONE SHOPPING. |
| 3 | CUSTOMER | WELL. |
| 4 | CUSTOMER | I TAKE A LOOK AT THE ADVERTISEMENT, AND I LOVE THE DESIGN OF THE ELECTRIC POT. |
| 5 | CUSTOMER | I WANT TO HAVE ONE CAPABLE OF BOILING HOT WATER WITH 1ST SPEED AMONG THE ELECTRIC POTS. |
| 6 | OPERATOR | I SEE. |
| 7 | OPERATOR | IF SO, I WOULD RECOMMEND THE MODEL MP32. |
| 8 | OPERATOR | THAT CAN BOIL 1L HOT WATER WITHIN A MINUTE. |
| 9 | CUSTOMER | DOES THIS COME WITH A HEAT-RETENTION FUNCTION? |
| 10 | OPERATOR | NO. |
| 11 | OPERATOR | IT ONLY HAS A FUNCTION FOR BOILING HOT WATER. |
| 12 | CUSTOMER | WELL. |
| 13 | CUSTOMER | BUT, I WOULD CHOOSE IT SINCE IT BOILS FIRST. |
| 14 | OPERATOR | WHICH COLOR DO YOU PREFER? |
| 15 | OPERATOR | WE HAVE THREE COLORS; YELLOW, BLUE, AND GREEN. |
| 16 | CUSTOMER | WHITE IS GOOD. |
| 17 | CUSTOMER | BUT, WHITE IS NOT AVAILABLE, ISN'T IT? |
| 18 | OPERATOR | NO, I AM SORRY. |
| 19 | CUSTOMER | THEN, COLOR YELLOW PLEASE. |
| 20 | OPERATOR | THANKS YOU VERY MUCH. |
| 21 | OPERATOR | THEN, YOUR NAME ··· |
| ... | ... | ... |

Fig. 4

| REMARK INDEX | PERSONAL IN CHARGE | CUSTOMER | REPORT SENTENCE | ORDERED PRODUCT | ... |
|---|---|---|---|---|---|
| ... | ... | ... | ... | ... | ... |
| 25361 | TARO YAMADA | HANAKO SUZUKI | THE ELECTRIC POT'S DESIGN WAS LOVED. SINCE THE 1ST SPEED BOILING MODEL WAS PREFERRED, MP32 WAS INTRODUCED. HEAT-RETENTION FUNCTION DOES NOT COME ALONG WAS EXPLAINED ALREADY. COLOR YELLOW WAS SELECTED. | MP32-Y:1 | |
| ... | | | ... | ... | ... |

Fig. 5

| ELEMENT | REMARK INDEX |
|---|---|
| ADVERTISEMENT | 4 |
| TAKE A LOOK | 4 |
| ELECTRIC POT | 4 |
| DESIGN | 4 |
| LOVE | 4 |
| HOT WATER | 5 |
| BOILING | 5, 13 |
| 1ST | 5, 13 |
| SPEED | 5, 13 |
| WANT | 5 |
| HEAT-RETENTION | 9 |
| FUNCTION | 9 |
| COME WITH | 9 |
| WHITE | 16, 17 |
| GOOD | 16 |
| NOT AVAILABLE | 17 |
| COLOR | 19 |
| YELLOW | 19 |

Fig. 6

| ELECTRIC POT |
|---|
| DESIGN |
| LOVED |
| 1ST |
| SPEED |
| BOILING |
| MODEL |
| PREFERED |
| MP32 |
| INTRODUCED |
| HEAT-RETENTION |
| FUNCTION |
| NOT |
| EXPLAINED |
| ALREADY |
| COLOR |
| YELLOW |
| SELECTED |

Fig. 7

| ELEMENT IN TELEPHONE CALL VOICE DOCUMENT | REMARK INDEX | REPORT DOCUMENT ELEMENT |
|---|---|---|
| ADVERTISEMENT | 4 | × |
| TAKE A LOOK | 4 | × |
| ELECTRIC POT | 4 | ELECTRIC POT |
| DESIGN | 4 | DESIGN |
| LOVE | 4 | LOVED |
| HOT WATER | 5 | × |
| BOILING | 5, 13 | BOILING |
| 1ST | 5, 13 | 1ST |
| SPEED | 5, 13 | SPEED |
| WANT | 5 | PREFERED |
| HEAT-RETENTION | 9 | HEAT-RETENTION |
| FUNCTION | 9 | FUNCTION |
| COME WITH | 9 | × |
| WHITE | 16, 17 | × |
| GOOD | 16 | × |
| NOT AVAILABLE | 17 | NOT |
| COLOR | 19 | COLOR |
| YELLOW | 19 | YELLOW |

Fig. 8

| |
|---|
| ADVERTISEMENT |
| TAKE A LOOK |
| HOT WATER |
| COME WITH |
| WHITE |
| GOOD |

Fig. 9

| REMARK INDEX | PERSONAL IN CHARGE | CUSTOMER | DIFFERENTIAL ELEMENT | ORDERED PRODUCT | ... |
|---|---|---|---|---|---|
| ... | ... | ... | ... | ... | ... |
| 25361 | TARO YAMADA | HANAKO SUZUKI | ADVERTISEMENT, TAKE A LOOK, HOT WATER, COME WITH, WHITE, GOOD | MP32-Y-1 | |

Fig. 10

| CHARACTERISTIC WORD | FREQUENCY | TOTAL FREQUENCY | CRITERION (ESC) |
|---|---|---|---|
| WHITE | 11 | 12 | 0.114 |
| ... | ... | ... | ... |
| ... | ... | ... | ... |

| REMARK INDEX | SPEAKER | REMARK TEXT |
|---|---|---|
| 4 | CUSTOMER | I TAKE A LOOK AT THE ADVERTISEMENT, AND I LOVE THE DESIGN OF THE ELECTRIC POT. |
| 5 | CUSTOMER | I WANT TO HAVE ONE CAPABLE OF BOILING HOT WATER WITH 1ST SPEED AMONG THE ELECTRIC POTS. |
| 9 | CUSTOMER | DOES THIS COME WITH A HEAT-RETENTION FUNCTION? |
| 16 | CUSTOMER | WHITE IS GOOD. |
| 17 | CUSTOMER | BUT, WHITE IS NOT AVAILABLE, ISN'T IT? |

| REMARK INDEX | PERSONAL IN CHARGE | CUSTOMER | REPORT SENTENCE | ORDERED PRODUCT | ... |
|---|---|---|---|---|---|
| ... | ... | ... | ... | ... | ... |
| 25361 | TARO YAMADA | HANAKO SUZUKI | I TAKE A LOOK AT THE ADVERTISEMENT, AND I LOVE THE DESIGN OF THE ELECTRIC POT. I WANT TO HAVE ONE CAPABLE OF BOILING HOT WATER WITH 1ST SPEED AMONG THE ELECTRIC POTS. DOES THIS COME WITH A HEAT-RETENTION FUNCTION? WHITE IS GOOD. BUT, WHITE IS NOT AVAILABLE, ISN'T IT? | MP32-Y:1 | ... |
| ... | | ... | ... | ... | ... |

Fig. 17

| CORRESPONDING ELEMENT | REMARK INDEX |
|---|---|
| ELECTRIC POT | 4 |
| DESIGN | 4 |
| LOVE | 4 |
| BOILING | 5, 13 |
| 1ST | 5, 13 |
| SPEED | 5, 13 |
| WANT | 5 |
| HEAT-RETENTION | 9 |
| FUNCTION | 9 |
| NOT AVAILABLE | 17 |
| COLOR | 19 |
| YELLOW | 19 |

Fig. 18

| REMARK INDEX | SPEAKER | REMARK TEXT |
|---|---|---|
| 16 | OPERATOR | WHITE IS GOOD. |

Fig. 19

| REMARK INDEX | PERSONAL IN CHARGE | CUSTOMER | REPORT SENTENCE | ORDERED PRODUCT | ... |
|---|---|---|---|---|---|
| ... | ... | ... | ... | ... | ... |
| 25361 | TARO YAMADA | HANAKO SUZUKI | WHITE IS GOOD. | MP32-Y:1 | |
| ... | | ... | ... | ... | ... |

Fig. 22

| ELEMENT IN TELEPHONE CALL VOICE DOCUMENT | REMARK INDEX | DIFFERENTIAL SCORE |
|---|---|---|
| ADVERTISEMENT | 4 | 0.745 |
| TAKE A LOOK | 4 | 0.174 |
| ELECTRIC POT | 4 | 0.006 |
| DESIGN | 4 | 0.006 |
| LOVE | 4 | 0.048 |
| HOT WATER | 5 | 0.023 |
| BOILING | 5, 13 | 0.032 |
| 1ST | 5, 13 | 0.047 |
| SPEED | 5, 13 | 0.137 |
| WANT | 5 | 0.046 |
| HEAT-RETENTION | 9 | 0.125 |
| FUNCTION | 9 | 0.015 |
| COME WITH | 9 | 0.062 |
| WHITE | 16, 17 | 0.862 |
| O.K. | 16 | 0.026 |
| NOT AVAILABLE | 17 | 0.004 |
| COLOR | 19 | 0.036 |
| YELLOW | 19 | 0.041 |

Fig. 23

| DIFFERENTIAL ELEMENT | REMARK INDEX | DIFFERENTIAL SCORE |
|---|---|---|
| ADVERTISEMENT | 4 | 0.745 |
| WHITE | 16, 17 | 0.862 |

Fig. 24

| REMARK INDEX | PERSONAL IN CHARGE | CUSTOMER | DIFFERENTIAL ELEMENT | | ORDERED PRODUCT | |
|---|---|---|---|---|---|---|
| ... | ... | ... | ... | ... | ... | ... |
| 25361 | TARO YAMADA | HANAKO SUZUKI | ADVERTISEMENT, WHITE. | ... | MP32-Y:1 | ... |
| ... | | ... | | ... | ... | ... |

| DIFFERENTIAL ELEMENT | REMARK INDEX | DIFFERENTIAL SCORE |
|---|---|---|
| ADVERTISEMENT | 4 | 0.745 |
| TAKE A LOOK | 4 | 0.174 |
| HOT WATER | 5 | 0.032 |
| COME WITH | 9 | 0.062 |
| WHITE | 16, 17 | 0.862 |
| GOOD | 16 | 0.026 |

| REMARK INDEX | PERSONAL IN CHARGE | CUSTOMER | DIFFERENTIAL ELEMENT AND DEFFERENTIAL SCORE | ORDERED PRODUCT | ... |
|---|---|---|---|---|---|
| ... | ... | ... | ... | ... | ... |
| 25361 | TARO YAMADA | HANAKO SUZUKI | ADVERTISEMENT (0.745)<br>TAKE A LOOK (0.174)<br>HOT WATER (0.032)<br>COME WITH (0.062)<br>WHITE (0.862)<br>GOOD (0.026) | MP32-Y:1 | ... |
| ... | ... | ... | ... | ... | ... |

TEXT MINING DEVICE, TEXT MINING METHOD, TEXT MINING PROGRAM, AND RECORDING MEDIUM

TECHNICAL FIELD

The present invention relates to a text mining device, a text mining method, a text mining program and a recording medium storing said program. More particularly, the present invention relates to a text mining that focuses on a difference between related document data.

BACKGROUND ART

Text mining has been known which processes statistical analysis after dividing an uncustomary natural text through natural language processing technique and analyzes tendencies or characteristics of the text.

By using such text mining technique, useful information is extracted from mass stored document information and it is expected to be utilized effectively in business methods such as marketing and so on.

For example, methods of analyzing questionnaire reply documents by text mining are disclosed in patent document 1 and patent document 2.

With such text mining, document analysis of extracting unique words that appear frequently across a number of questionnaire reply document data or extracting related words that appear with high correlativity toward a particular word, becomes available and is utilized in marketing and so on.

[Patent Document 1] Japanese Unexamined Patent Application Publication 2001-266060
[Patent Document 2] Japanese Unexamined Patent Application Publication 2006-286026

DISCLOSURE OF INVENTION

Technical Problem

Indeed, extracting common words is beneficial when processing questionnaire replies and so on, however, when analyzing actual documents, there are some times where a difference between plural related documents should be focused on.

However, analysis results that focus on the difference between documents cannot be obtained by just performing statistical processes on data which is processed through the natural language processing (for example, dividing into words) such as conventional text mining.

Therefore, useful information buried in a stock of document data has not yet been utilized even now.

For such a problem, a text mining method which performs document analysis that focuses on a difference between plural text data has been desired.

An object of the present invention is to provide a text mining device, a text mining method, a text mining program and a recording medium that stores said program which appropriately perform analysis related to a difference between a plurality of related document data.

Technical Solution

A text mining device according to the present invention includes a element extracting section that extracts language elements from related two or more document data respectively; a differential processing section that extracts a difference between the document data by comparing the elements between the document data which were extracted by the element extracting section; and a statistical processing section that performs statistical processing on the difference extracted by the differential processing section.

Advantageous Effects

With such configuration, the statistical processing may be performed against the differential data after extracting the difference between the related document data. Therefore, information may be retrieved with focusing on the difference between plural document data, thus information not utilized in past may become usable effectively.

BRIEF DESCRIPTION OF DRAWINGS

FIG. 3 shows one example of a voice telephone call record;
FIG. 4 shows one example of a report document;
FIG. 5 shows a table that indicates a result of extracting elements in a telephone call voice record in the first exemplary embodiment;
FIG. 6 shows a table that indicates a result of extracting elements in the report document in the first exemplary embodiment;
FIG. 7 shows a table that indicates a result of associating an element of the telephone call voice record with an element of the report document in the first exemplary embodiment;
FIG. 8 shows a table of elements extracted as a differential element in the first exemplary embodiment;
FIG. 9 shows a data table which records differences in the first exemplary embodiment;
FIG. 10 shows one example of a result of a statistical process of differential data that relates to customers who bought a particular product (MP32-Y) in the first exemplary embodiment;
FIG. 13 shows a data table of extracted differential blocks in the second exemplary embodiment;
FIG. 14 shows one example of the data table that records differences in the second exemplary embodiment;
FIG. 17 shows a result of extracting ones having a corresponding element in the third exemplary embodiment;
FIG. 18 shows a result of extracting no-corresponding element differential block in the third exemplary embodiment;
FIG. 19 shows a data table that records the no-corresponding element differential blocks in the third exemplary embodiment;
FIG. 22 shows a result of calculating a differential score of each element in the forth exemplary embodiment;

FIG. 23 shows a result of extracting differential elements in the forth exemplary embodiment;

FIG. 24 shows one example of data table that records the differential elements in the forth exemplary embodiment;

FIG. 27 shows a table indicating differential scores that are calculated for respective differential elements in the fifth exemplary embodiment;

FIG. 28 shows a data table that records the differential element and the differential score in the fifth exemplary embodiment.

Figure 1:
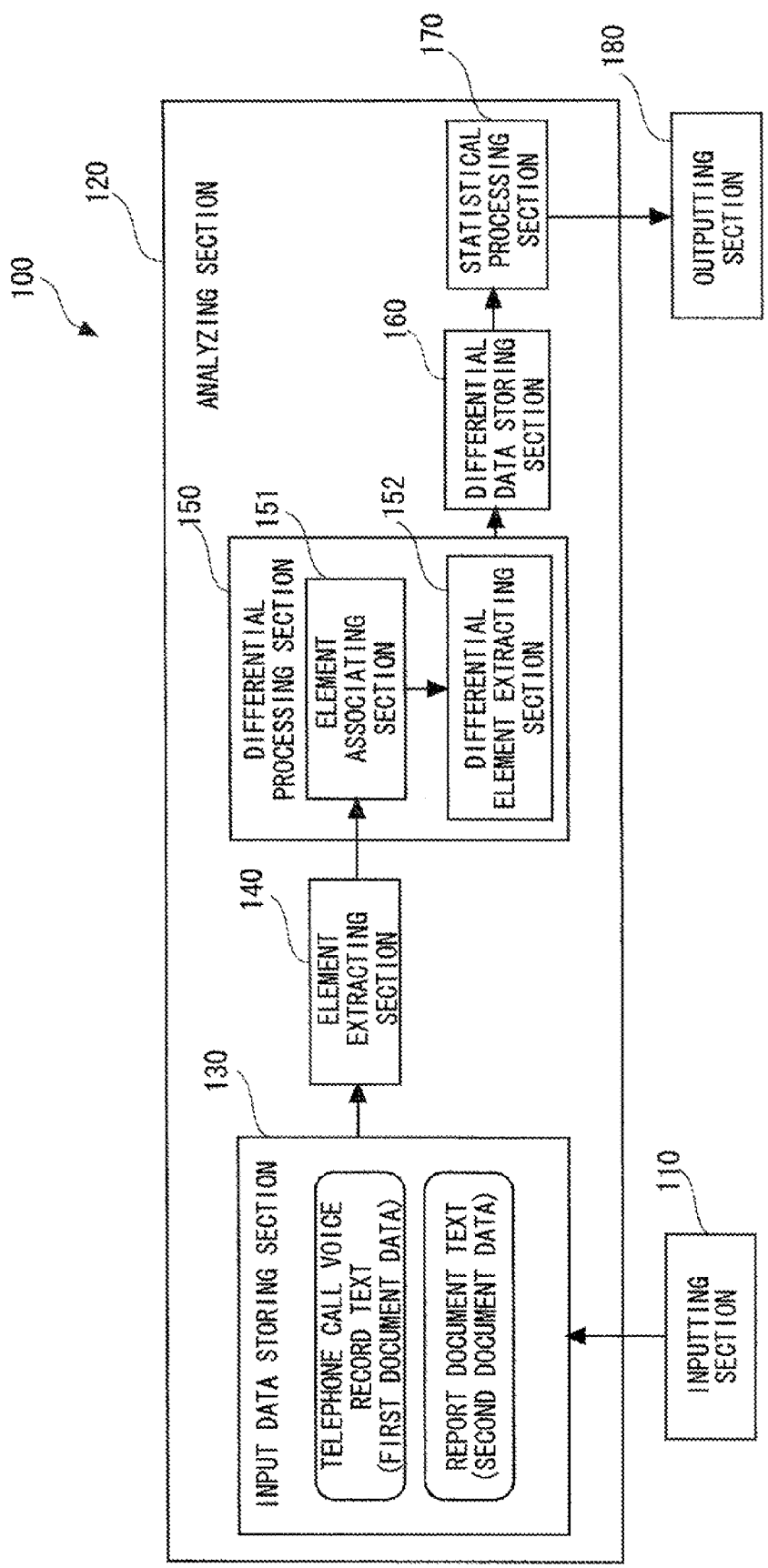
FIG. 1 shows a configuration according to a first exemplary embodiment.

EXPLANATION OF REFERENCE 10, 100, 200, 300, 400, 500 text mining device
110 inputting section
120 analyzing section
130 input data storing section
14, 140 element extracting section
15, 150, 250, 350, 450, 550 differential processing section
151 element associating section
152 differential element extracting section
153 differential block extracting section
154 corresponding element extracting section
155 differential block with no corresponding extracting section
156 differential score calculating section
157 differential element extracting section
160 differential data storing section
17, 170 statistical processing section
180 outputting section.

BEST MODE FOR CARRYING OUT THE INVENTION

Exemplary embodiments of the present invention are disclosed in Figures, and explanations are made with reference to symbols that are inserted in the Figures.

First Exemplary Embodiment

FIG. 1 shows a configuration of a first exemplary embodiment according to a text mining device 100 of the present invention.

The text mining device 100 has an inputting section 100 that inputs document data which is to be a subject of text mining, an analyzing section 120 that analyzes the input document data, and an outputting section 180 that outputs a result of the analysis.

The inputting section 110 is, for example, a keyboard, a voice recognition microphone, a scanner, and others such as a drive device for reading out stored data in an external recording medium.

In this embodiment, a subject of the text mining process is a plurality of related document data, but the number of the document data is not limited in particular.

For the sake of explanation, in the explanation below, a case, where a pair of two related document data are subject to the text mining and are input from the inputting section 110, is took for example, and one pair of the two documents are treated as first document data and second document data.

The analyzing section 120 has an input data storing section 130 that temporarily stores document data input from the inputting section 110; an element extracting section 140 that extracts an independent word as a component of a text by performing language processing against the document data stored in the input data storing section 130 and; a differential processing section 150 that extracts a difference between the document data; a differential data storing section 160 that temporarily holds differentially processed data; and a statistical processing section 170 that performs a statistical processing against the extracted difference.

The input data storing section 130 temporarily stores and records the data (the first document data and the second document data) input from the inputting section 110.

The element extracting section 140 performs natural language processing against the first document data and the second document data, and extracts a component of a sentence. One or more of a character line in the document data, a word, a character N-gram, a word N-gram, a sentence structure, a partial structure of the sentence structure, and a sentence is an element which the element extracting section 140 extracts, and, in this embodiment, a case where independent word is being extracted is exemplified and explained.

The differential processing section 150 has an element associating section 151 that compares extracted elements respectively extracted from the two document data and associates respective elements between the two documents; and a differential element extracting section 152 that extracts an element, which does not have a corresponding element of a pair, as a differential element at the stage of the association by the element associating section 151.

The element associating section 151 compares respective elements of two documents that are extracted by the element extracting section 140. Then, against respective elements of the two documents, the elements which are in identical, similar, synonymous, or analogous relation are being associated.

The differential element extracting section 152 extracts elements having no corresponding element between the two document data at the stage of the association by the element associating section 151, as differential elements. Further, as for the difference between two document data, an element which is an element of the first document data and does not have a corresponding element in the second document data is being extracted as the differential element when focusing on an element which exists in one of the document data and does not exist in the other document data.

The differential data storing section 160 temporarily buffers the extracted difference before performing statistical processing. Pairs of the related first document data and the second document data are sequentially input from the inputting section 110, and then accumulated in the differential data storing section 160 after a differential process.

The statistical processing section 170 performs statistical processing against the extracted differential elements. As for such statistical processing, expanded-type stochastic complexity and so on may be cited as examples.

The outputting section 180 is configured by a printer or a monitor and so on, and displays a process result by the statistical processing section 170.

Figure 2:
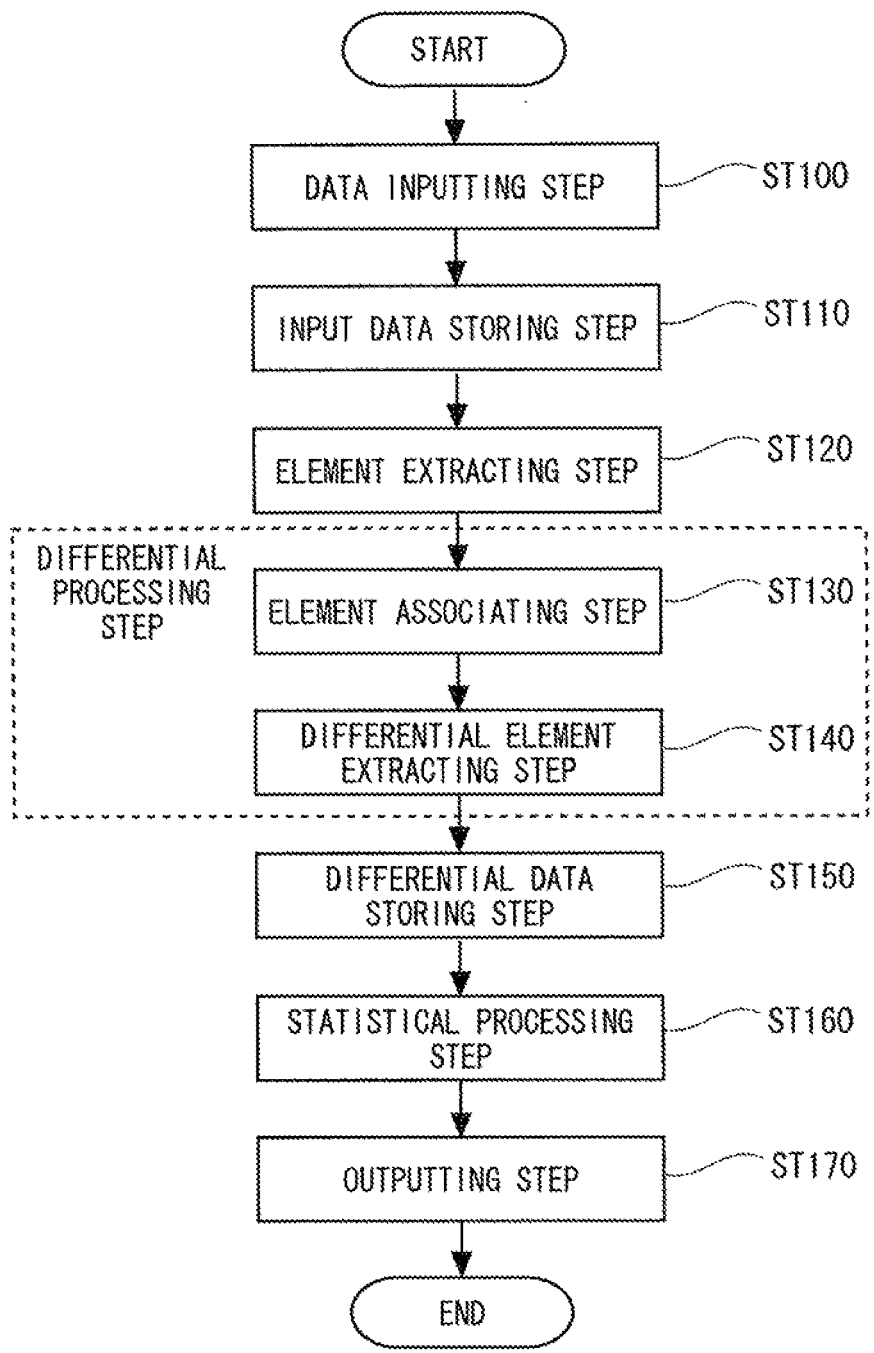
FIG. 2 shows a flowchart showing a procedure of text mining method in the first exemplary embodiment.

An operation of the first exemplary embodiment having such configuration is explained. FIG. 2 is a flowchart indicating a procedure of a text mining method according to this embodiment.

When performing the text mining, firstly, document data to be a subject of the text mining are being input from the inputting section 110 (an input step, ST100).

Here, the document data to be input at the input process of ST100 are explained.

In the text mining of the present embodiment, input is a pair of document data in which a difference is to be noticeable. For example, related documents that are created for one subject in different principles may be cited as an example for the pair of the document data in which the difference is to be noticeable.

In such related documents, there are a mutually common portion and a differential portion that is included in one document data but not included in the other document data. There are chances where valuable information exists in such differential portion.

Services at a call center will be explained as an example.

The call center is in charge of selling products through phone handling, but recently not limited to the mere phone handling, and it has been becoming to be an important division in terms of a strategic marketing through forming a database of customer information based on its handling result.

At the call center, handling records with customers are recorded as raw data such as telephone call voice records by functions of computer integrated phone or fax, FAXs, and E-mails, and the customer handlings are being recorded in a form of report documents created by operators too.

For example, FIG. 3 is one example of the voice telephone call record, and FIG. 4 is one example of the report document.

The report documents are composed in a simple form based on determinations of the operator, and which become highly useable documents including main contents of the customer handling, these information are adequate enough for a need normally.

Note that it is more often deleted from the report document such a portion that the operator could not understand from the statements of the customer, a handling that is deviated from a primary theme of the sales, and a history of hearings or detail product explanations which are exchanged with the customer.

Further, situation determinations and presumption matters by the operator, and matters that are not necessary to directly explain to the customer do not appear on the telephone call voice record, and are only recorded in the report document.

Like this way, the information recorded in only one medium includes useful information such as fresh voices of the customers, and manners how the operator handled. Therefore, it becomes necessary to analyze the difference between such telephone call voice record and the report document.

In the explanation of the present embodiment, the telephone call voice record (FIG. 3) is input as the first document data and the report document (FIG. 4) is input as the second document data, from the inputting section 110.

The input document data at the input process (ST100) is recorded in the input data storing section 130 (Input data recording step ST110). At this moment, the telephone call voice record and the report document which have a same reception index are made into a pair and stored.

The data stored in the input data storing section 130 is output to the element extracting section 140 on the pair to pair basis, and an extraction of the element through the use of the element extracting section 140 is performed (Element extracting step ST120). As for the element, a word is extracted, and independent word is extracted from a morpheme that is gained through a morpheme analysis especially.

Note that, here, elements are extracted from the customer's remarks in connection with the telephone call voice record, from an estimation that valuable information regarding to the marketing are considered to be buried in the customer's remark. FIG. 5 shows a result of the element extraction against the telephone call voice record, and FIG. 6 shows a result of the element extraction against the report document.

Next, the extracted element is output to the element associating section 151 on the document data basis, and respective elements between the documents of the same pair are being associated (Element associating step ST130).

That is, the elements which are in identical, similar, synonymous, or analogous relation are being associated. Here, existing methods are applicable for associating the elements.

For example, synonymous dictionaries can be used, and a correspondence relation "a" can be obtained as follows based on such relationship that the report document is equivalent to a compendium of the telephone call voice record.

That is, if a collection of elements extracted from the customer's remark in the telephone call voice record is signified by D, and a collection of elements extracted from the report document is signified by R, the following relationship is established that the collection R is a compendium of the collection D.

At this moment, the correspondence relationship a between elements d and r of the respective collection D and the collection R is calculated such that a posterior probability $P(R/D)$, where the collection R is generated against the collection D, is set to be maximized (For example, it is disclosed in Stephan Vogel, Hermann Ney, and Christoph Tillmann. 1996. HMM-Based Word Alignment in Statistical Translation. In COLING '96: The 16th Int. Conf. on Computational Linguistics, pages 836-841, Copenhagen, Denmark, August.).

$$a = \mathrm{argmax}_a P(R/D, a) = \mathrm{argmax}_a P(D/R, a) P(R)$$

As a result, the association shown in FIG. 7 is obtained.

In this way, the data of the associated elements is output to the differential element extracting section 152, and a differential element extraction is then performed at the differential element extracting section 152 (Differential element extracting step ST140). In the FIG. 7, an element that is in the phone call voice record and does not have a corresponding element among the report document is extracted as the differential element. FIG. 8 is a chart of elements that are extracted as the differential element.

The elements extracted by the differential element extracting section 152 are output to the differential data storing section 160, and then being buffered temporarily (Differential Data storing step ST150). At this moment, the extracted differential elements are organized in a data table together with related factors such as a reception index, a personal in charge, a customer name, and an ordered product. FIG. 9 is an example of the data table that records the differences.

The statistical processing section 170 performs statistics processing against the differential data that have been collected as such (Statistical process ST160). FIG. 10 is an example of a result of the statistical processing of the differential data which are related with a customer who bought the product MP32-Y. Such statistics result is output from the outputting section 180, and is printed out by a printer or displayed by a monitor (Outputting step ST170).

In accordance with such first exemplary embodiment, it has been found out that there exists not a little desires that "white is fine" among customers who bought yellow electric pot MP32.

In past, in spite of that there is beneficial information as above, expressions frequently appearing in common at the telephone call voice record and the report document tend to be distinguished, thus important information had been buried and not utilized.

With respect to this point, in the present embodiment, a configuration which extracts differences between two document data and then performs the statistical process against the differential data has been employed. Therefore, information which could not be retrieved in the past text mining can be retrieved. For example, beneficial information such as "white is fine", "yellow is fine", and "green is fine" and so on which are stated when many customer are placing their color orders can be digged up.

Second Exemplary Embodiment

Next, a text mining device 200 according to the second exemplary embodiment of the present invention is explained.

A basic configuration of the second exemplary embodiment is the same with the first exemplary embodiment, but has a feature that a differential block is extracted in the differential processing section 250.

Figure 11:
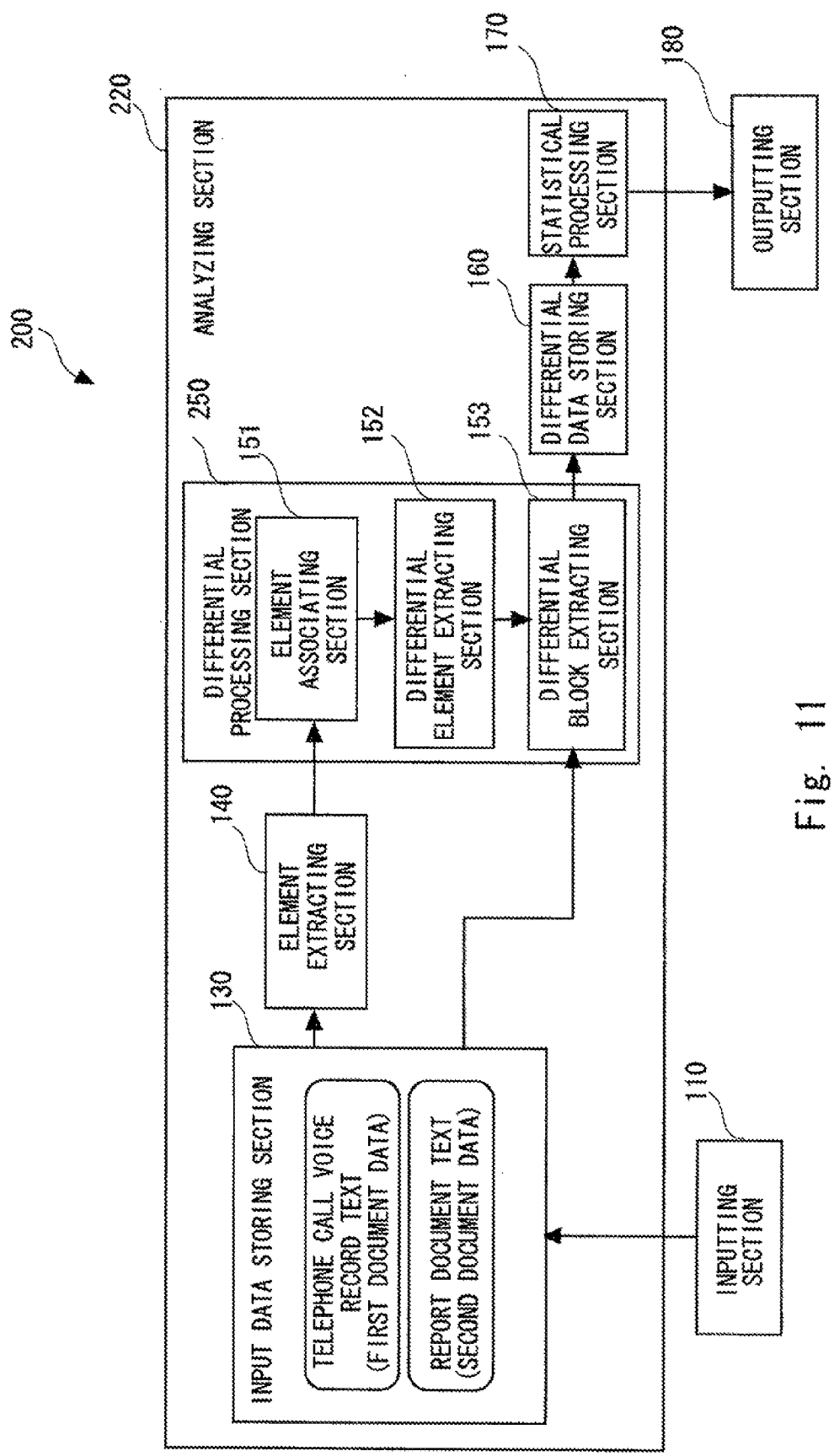
FIG. 11 shows a configuration according to a second exemplary embodiment.

FIG. 11 is a figure showing a configuration of the second exemplary embodiment.

In this second exemplary embodiment, the differential processing section 250 has an element associating section 151, a differential element extracting section 152, and a differential block extracting section 153.

The differential block extracting section 153 receives a differential element extracted in the differential element extracting section 152, and extracts a bigger element, which includes the differential element, as a differential block by comparing said differential element with the document data stored in the input data storing section 130. Here, the differential block extraction section extracts a sentence structure or a partial structure of the sentence structure as a unit of the differential block.

Figure 12:
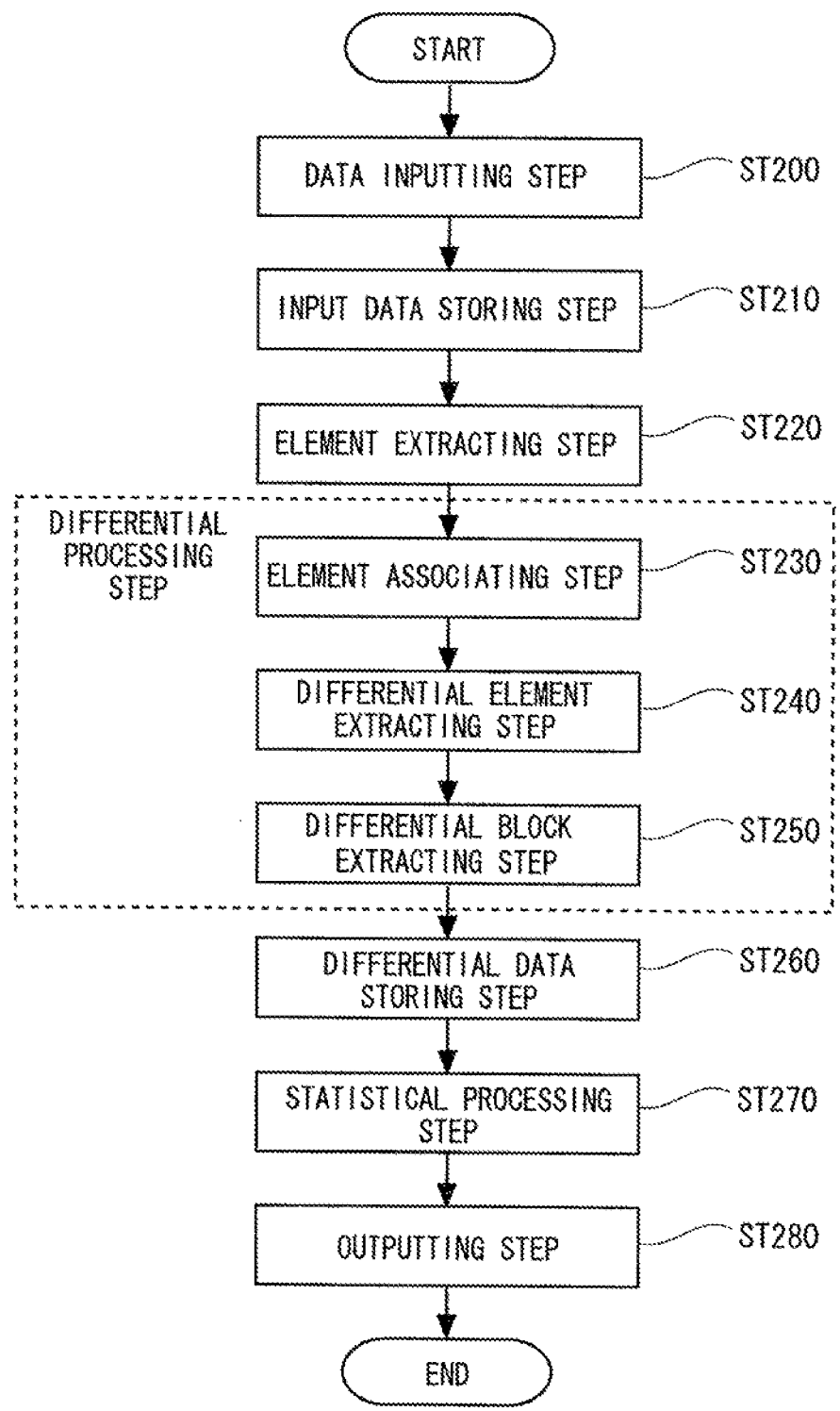
FIG. 12 shows a flowchart indicating a procedure of text mining method according to the second exemplary embodiment.

FIG. 12 is a flowchart showing the sequence of the text mining method according to the second exemplary embodiment.

In the differential element extraction step (ST240), the differential element between the telephone call voice record and the report document is extracted, and the table of FIG. 8 is obtained.

Sentences including the differential elements extracted as such are extracted as the differential blocks from the telephone call voice record (Differential block extracting step ST250). For example, as for the differential elements shown in FIG. 8, the original voice telecommunication record that includes such elements has remark indexes 4, 5, 9, 16, and 17 (See FIG. 3). Then, these remark indexes 4, 5, 9, 16, and 17 are extracted as the differential block.

FIG. 13 is a data table of the differential blocks extracted as such.

The differential blocks extracted as such are buffered to the differential data storing section 160 (Differential data storing step ST260). The data of the differential block is arranged at the data table together with relational factors such as the reception index, the personal in charge, the customer name, and the ordered product. FIG. 14 is an example of the data table recording the difference. The statistical processing is performed by the statistical processing section 170 against the differential data collected as such (Statistical processing step ST160), and outputted to the outputting section 180 (Outputting step ST170).

In accordance with such second exemplary embodiment, the original sentence (the differential block) is extracted based on the differential element, thus it is achieved to collect the difference information without any omission and gain the differential data precisely and accurately. Then, it becomes possible to extract important information more accurately which was buried in past, by performing the statistical process against the differential data obtained as such.

The Third Exemplary Embodiment

Next, the text mining device 300 according to the third exemplary embodiment of the present invention is explained.

A basic configuration of the third exemplary embodiment is the same with the second exemplary embodiment, but has a feature that a block which does not have a corresponding element among the differential block extracted by the differential block extracting section 153 is only extracted as the difference.

Figure 15:
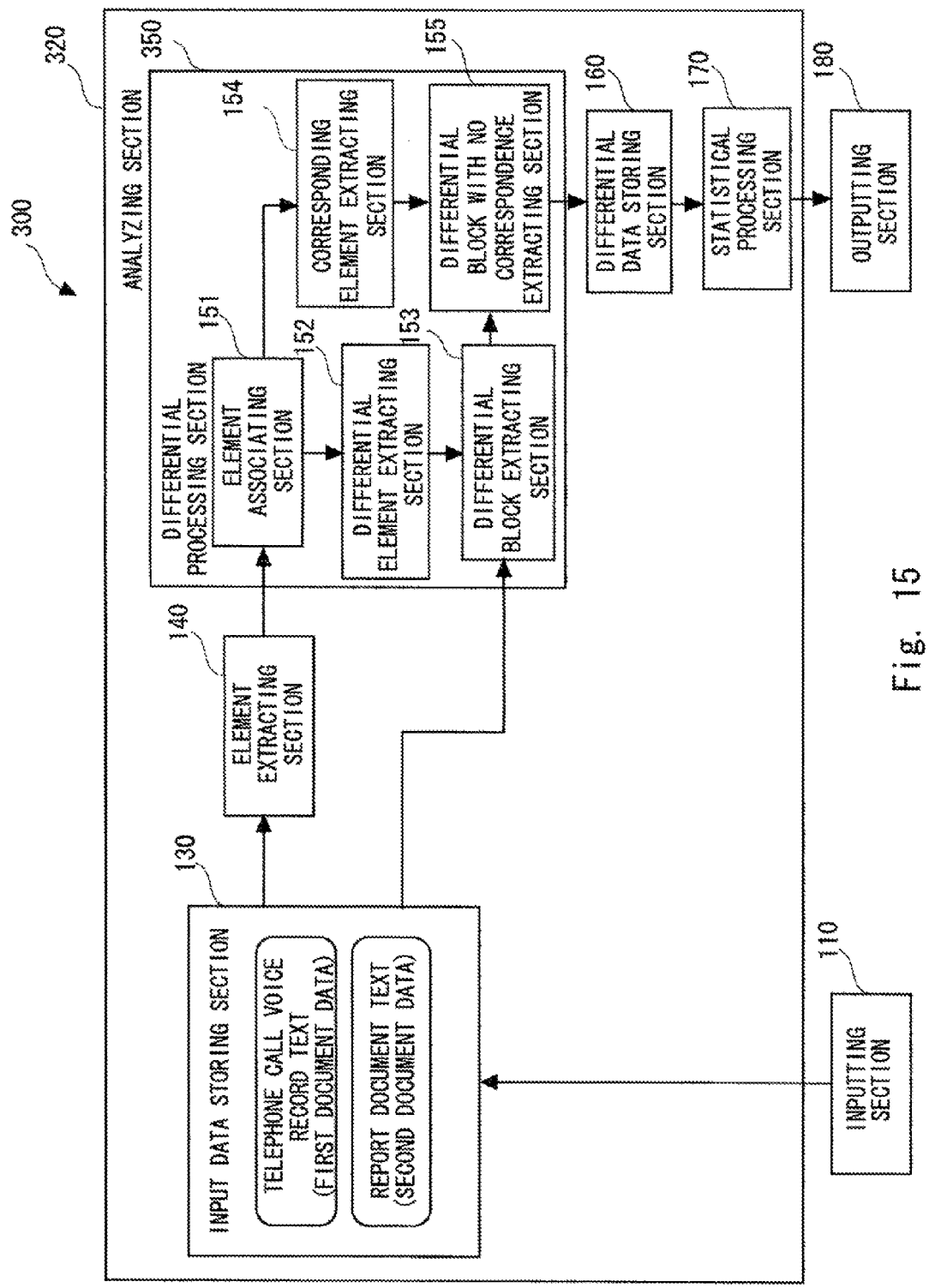
FIG. 15 shows a configuration according to a third exemplary embodiment.

FIG. 15 is a figure showing a configuration of the third exemplary embodiment.

In this third exemplary embodiment, the difference processing section 350 has an element associating section 151, a differential element extracting section 152, a differential block extracting section 153, and a corresponding element extracting section 154, and a differential block with no corresponding extracting section 155.

The element associating section 151, and the differential element extracting section 152, and the differential block extraction section 153 are same with the configurations explained in above exemplary embodiments.

That is, the differential block extracting section 153 extracts the block (sentence) including the differential element.

Here, the corresponding element extracting section 154 extracts one which has a mutually corresponding element from the data of the elements associated by the element associating section 151.

The no-corresponding differential block extraction section 155 deletes one which includes a corresponding element extracted by the corresponding element extracting section 154 from the differential blocks extracted by the differential block extracting section 153, and extracts only the differential block which does not have the corresponding element.

Figure 16:
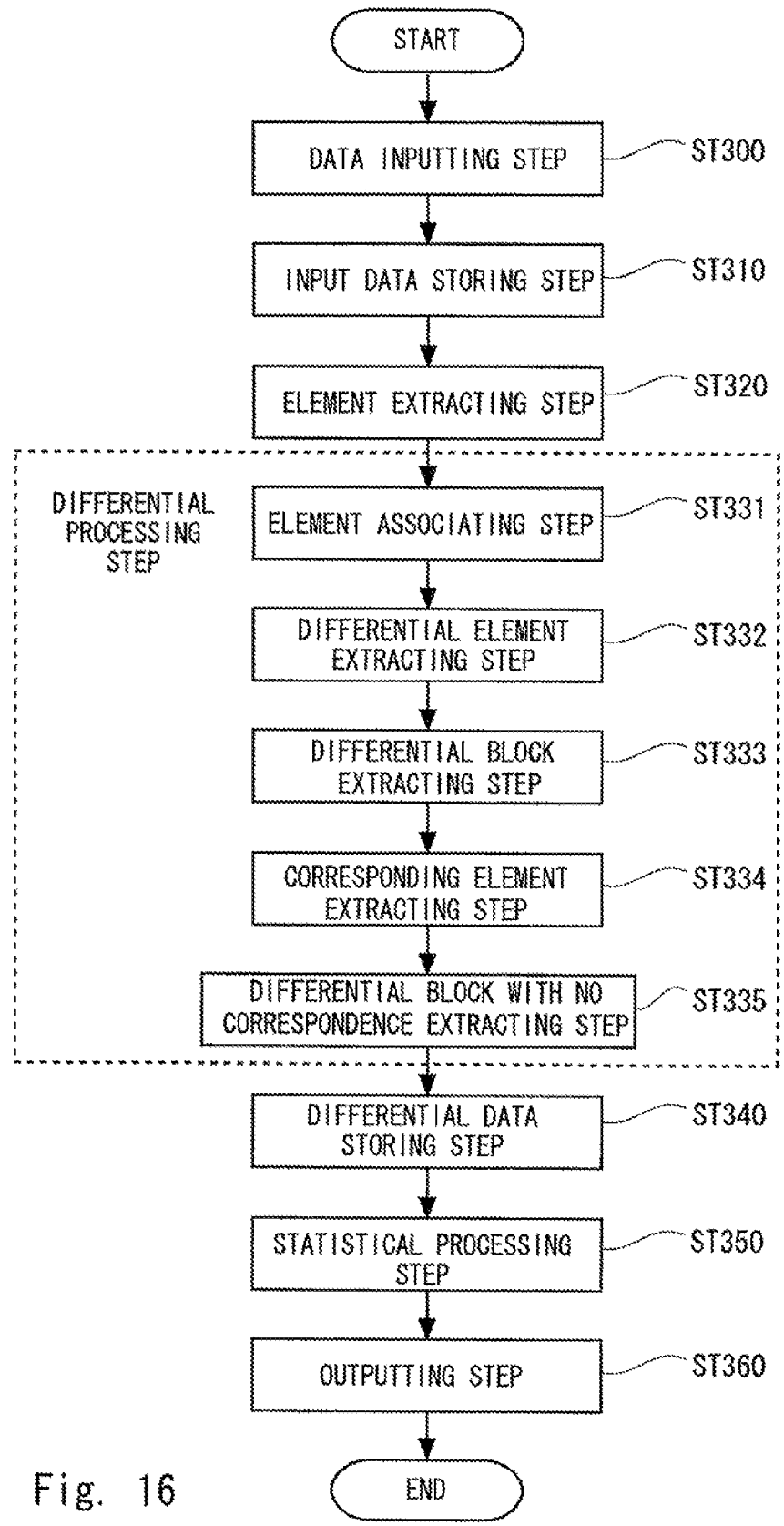
FIG. 16 shows a flowchart indicating a procedure of a text mining method in the third exemplary embodiment.

FIG. 16 is a flowchart indicating a procedure of the text mining method according to the third exemplary embodiment.

The differential block is extracted which includes the differential element in the differential block extraction step (ST133), and the table of the differential block shown in FIG. 13 is obtained.

While the table of FIG. 7 is obtained by associating (ST331) by the element associating section 151, the one having mutually corresponding element is extracted from the table (FIG. 7) by the corresponding element extracting section 154 (Association element extracting step ST334).

The elements having the corresponding element are extracted from the table shown in FIG. 7, and then the table shown in FIG. 17 is obtained.

Next, the elements having the corresponding element (FIG. 17) are deleted from the table of the differential block (FIG. 13), and the block having no corresponding element is being extracted (Block with no correspondence extracting step ST335).

Then, only the block with the remark index 16 is extracted as a differential block with no corresponding element (FIG. 18).

The differential block with no corresponding element extracted as such is buffered to the differential data storing section 160 (Differential data storing step ST340).

The data of the differential block is arranged in the data table together with the relation indexes such as the reception index, the personal in charge, the customer name, and the ordered product.

FIG. 19 is an example of the data table recording the differential block with no corresponding. The statistical process is performed by the statistical processing section 170 against the data of the differential block with no corresponding collected as such, and which are outputted to the outputting section 180 (Outputting step ST360).

In accordance with the third exemplary embodiment having such configuration, the difference between both are extracted as differential blocks without a loss, and further the one which does not have the corresponding element is extracted, therefore it is achieved to extract the difference which is inherently included in one of the document data precisely and accurately. Then, the statics process is performed against the differential block with no corresponding extracted as such, and it becomes possible to extract the important information precisely which was buried in past.

The Fourth Exemplary Embodiment

Next, the text mining device 400 according to the forth exemplary embodiment of the present invention is explained.

A basic configuration of the fourth exemplary embodiment is the same with the first exemplary embodiment, but has a feature in a configuration where the differential element is extracted in the differential processing section 450.

Figure 20:
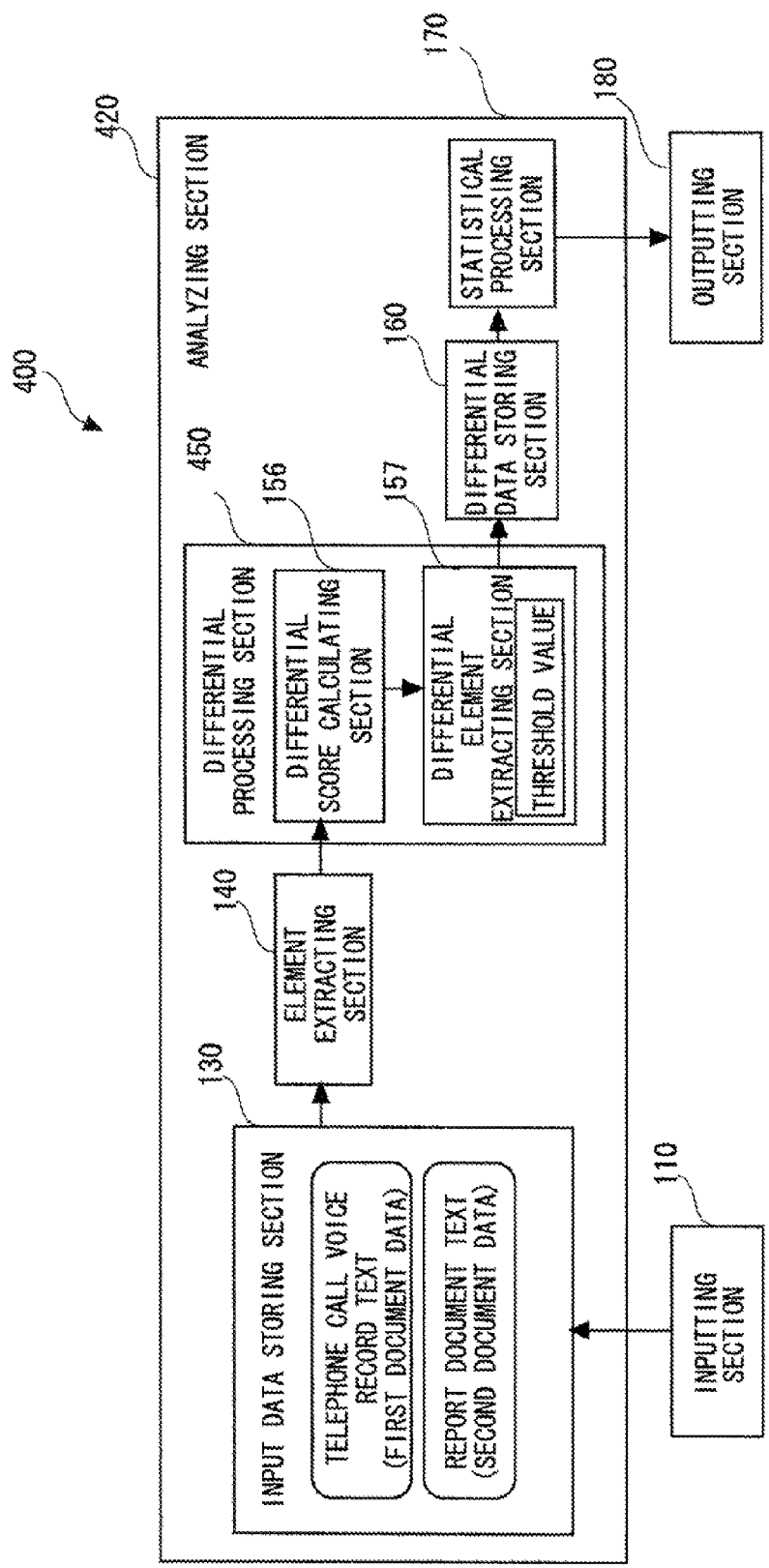
FIG. 20 shows a configuration of a forth exemplary embodiment.

FIG. 20 is a figure showing a configuration of the fourth exemplary embodiment.

In the forth exemplary embodiment, the differential processing section 450 has a differential score calculating section 156, and a differential element extracting section 157.

The differential score calculating section calculates a differential score, which indicates a state of difference, against each element in the first document data. That is, while the respective elements are extracted from the first document data and the second document data by the element extracting section 140, the differential score is calculated for each element of the first document data by comparing the element of the first document data and the element of the second document data.

Here, a differential score (d) against an arbitrary element d in the first document data is defined in the following formula (1).

Note that β is a positive integer.

D is a probability of the appearance of the element d in the first document data, R, is a probability of the appearance of the element $r_i$ in the second document data, and $I(D;R_i)$ is a mutual information quantity of the stochastic variable D and $R_i$.

[Number ]
<IMG SRC="math01.GIF">

A differential score threshold value for extracting the differential element is set in the differential element extracting section 157, and the differential element extracting section 157 extracts an element in which the differential score calculated by the differential score calculating section 156 is equal to or over the threshold, as the differential element.

Figure 21:
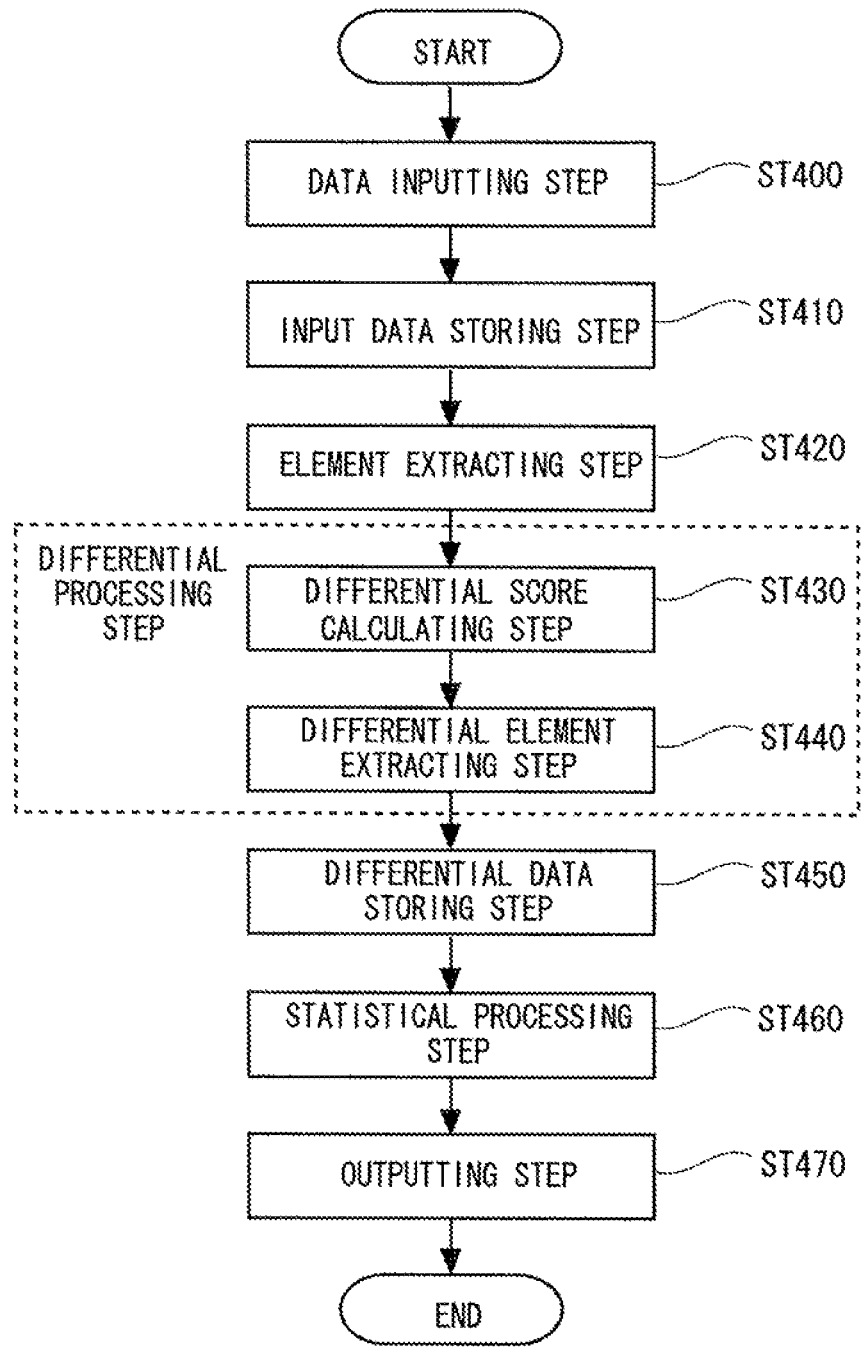
FIG. 21 shows a flowchart indicating a procedure of a text mining method in the forth exemplary embodiment.

FIG. 21 is a flowchart indicating a procedure of the text mining method according to the forth exemplary embodiment.

Respective elements are extracted from the telephone call voice record and the report document at the element extraction step (ST420), and tables of element shown in FIG. 5, and FIG. 6 are obtained respectively. Then, the differential score is calculated against each element (FIG. 5) in the voice telephone call record by the differential score calculating section (Differential score Calculating Step, ST430).

The differential score is calculated by means of said formula (1) against the arbitrary element d in the telephone call voice record. Here, providing that β is 100, the differential score is calculated against each element in the telephone call voice record, and then the data of the differential score shown in FIG. 22 is obtained.

The data of the calculated differential score is output to the deference element extracting section 157, and the deference element is extracted based on the differential score (Differential element extracting step ST440).

That is, the element having its differential score equal to or over the threshold is extracted as the differential element. Here, the difference threshold is set to 0.5, and the differential elements are extracted as in FIG. 23.

The differential elements extracted as such are buffered to the differential data storing section 160 (Differential data storing step ST450).

The data of the differential element is arranged in the data table together with the relational factors such as the reception index, the personal in charge, the customer name, and the ordered product. FIG. 24 is an example of the data table recording the differential elements. The statistical process against the differential data collected as such is performed by the statistical processing section 170 (Statistical processing step ST460), and its outputs are output to the outputting section 180 (Outputting step ST470).

In accordance with the forth exemplary embodiment having such configuration, because the difference is extracted by using the calculated value of the differential score, the differential elements are extracted without relying on synonymous dictionaries or learned data of associated words. That is, there is no need in time and effort to investigate one by one the correspondence in identification, similarity, synonymy, or analog between elements, thereby improving the process efficiency.

Additionally, since the threshold value in the differential element extracting section 157 can be set arbitrarily, it becomes arbitrary in widening or narrowing a range of the difference to be extracted in accordance with a characteristic of information to be collected, therefore the efficiency of the text mining is improved in parallel with that an accuracy of the accurate mining of the intended information is being improved.

The Fifth Exemplary Embodiment

Next, the text mining device 500 according to the fifth exemplary embodiment of the present invention is explained.

A basic configuration of the fifth exemplary embodiment is the same with the first exemplary embodiment, but has a feature in that a differential score calculating section 156 is provided in the difference processing section 550.

Figure 25:
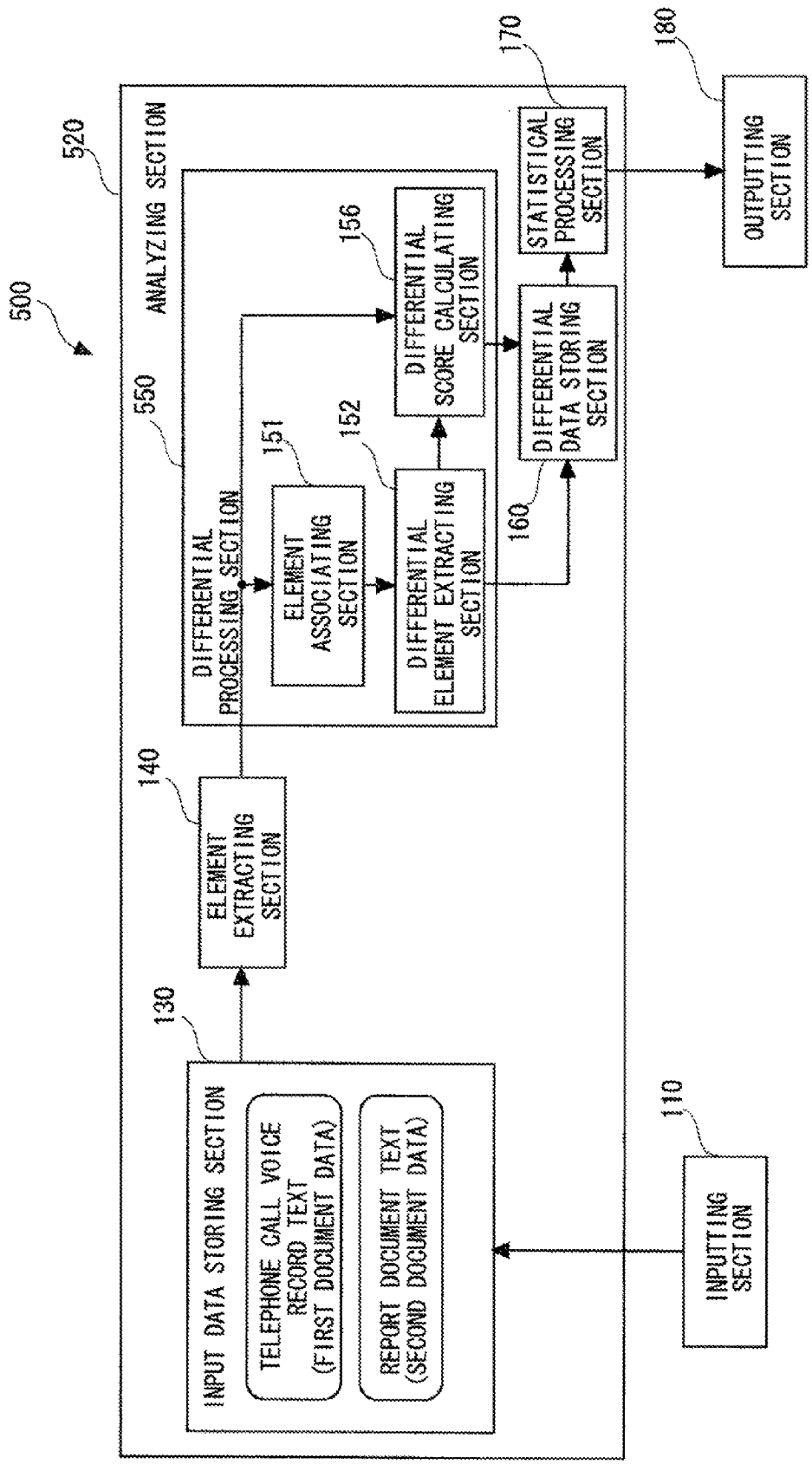
FIG. 25 shows a configuration according to a fifth exemplary embodiment.

FIG. 25 is a figure indicating a configuration of the fifth exemplary embodiment.

In the fifth exemplary embodiment, the difference processing section 550 has the element associating section 151, the differential element extracting section 152, and the differential score calculating section 156.

The element associating section 151 and the differential element extracting section 152 are same with the configurations explained in the first exemplary embodiment.

The respective elements of the two document data are associated by the element associating section. The one which appears only one of the document data and does not have the corresponding element is extracted by the differential element extracting section 152 as the differential element.

The differential score calculating section is the same with the configuration explained in the forth exemplary embodiment.

Note that, in the fifth exemplary embodiment, the differential score calculating section 156 calculates the differential score against each differential element extracted by the differential element extracting section 157. Then, it is being stored into the differential data storing section 160 with the differential score being attached to the differential element extracted at the differential element extracting section 152.

Figure 26:
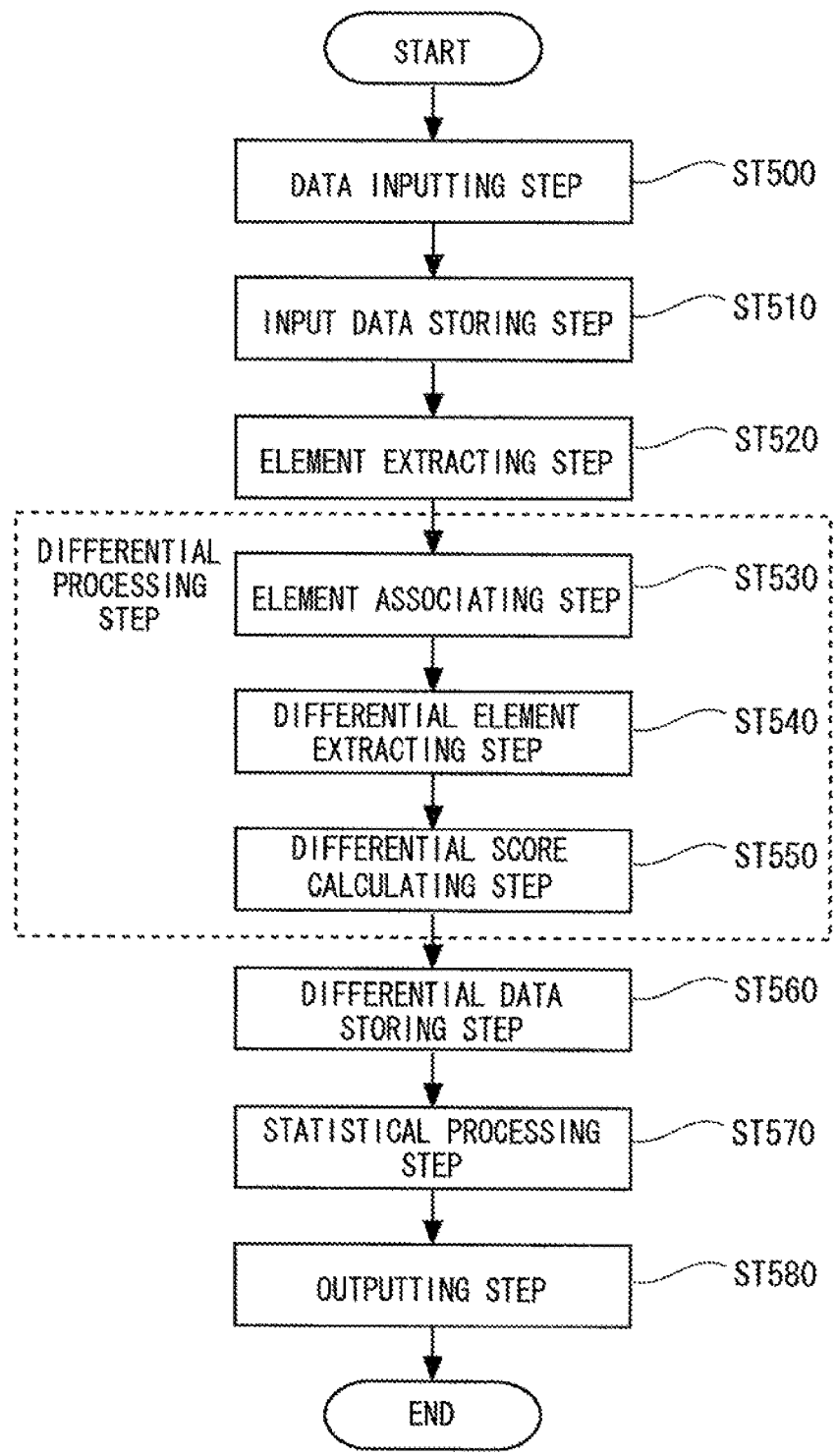
FIG. 26 shows a flowchart indicating a procedure of a text mining method in the fifth exemplary embodiment.

FIG. 26 is a flowchart indicating a procedure of the text mining method according to the fifth embodiment.

The chart of the associated elements shown in FIG. 7 is obtained by the element associating step (ST530), and further the differential element not having the corresponding element is extracted by the differential element extraction step (ST540) (See FIG. 8). Further, the differential score is calculated against respective extracted differential elements. Then, the differential scores of the respective differential elements are obtained as shown in FIG. 27.

The differential element and the differential score obtained as such are buffered into the differential data storing section 160 (Differential data storing step ST560). The differential element and the differential score are arranged and stored in the data table together with relational factors such as the reception index, the personal in charge, the customer name, and the ordered product (See FIG. 28).

The statistical process is performed by the statistical processing section 170 against the data of difference collected as such (Statistical processing step ST570). At the statistical process step (ST570) in the statistical processing section 170, the differential score calculated with respect to each differential element is treated as a weight of the state of difference, thereby the difference to be extracted against one keyword is further extracted as a partial complex of difference with high accuracy degree, not as an even difference complex. Its process result is outputted to the outputting section 180 (Outputting step ST580).

In accordance with the fifth exemplary embodiment having such configuration, the differential score is calculated for the difference element, and the statistical process is performed in consideration of the differential score, thereby the text mining with high accuracy is achieved in the text mining that focuses on the difference between the two document data.

The invention is not limited to the exemplary embodiments described above, and various modifications may be added within a range not deviating from a substance of the invention.

Figure 29:
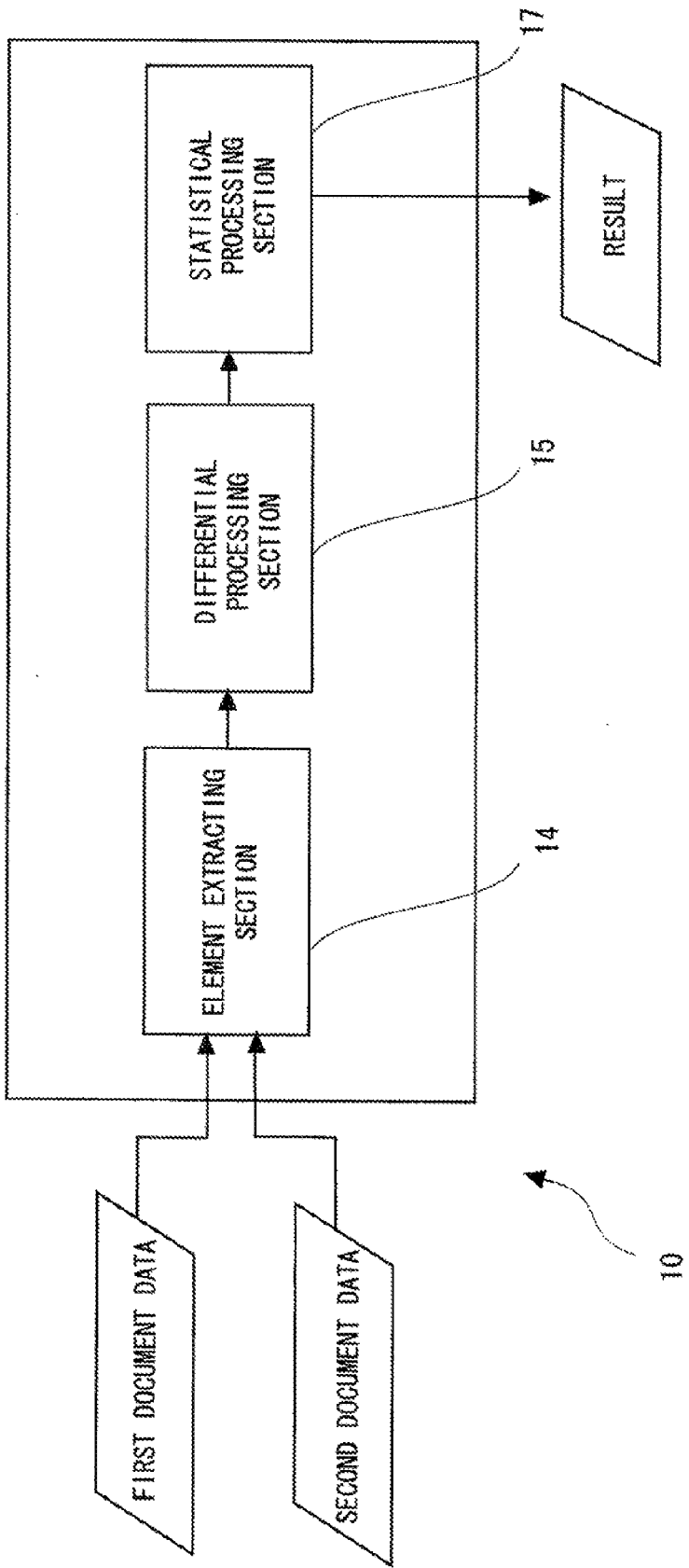
FIG. 29 shows a minimum configuration for performing this invention.

Detail configurations are shown as examples to implement the current invention in the above exemplary embodiment, but not limited to the above exemplary embodiment, and as for the text mining device 10, it may have the element extracting section 14, the difference processing section 15, and the statistical processing section 17 as shown in FIG. 29.

With such configuration, the element such as a character line or words and so on which are included in the document data are extracted from the input document data by the element extracting section, and the extracted result is output to the difference processing section.

The difference section compares each extracted element, and extracts the difference between two document data.

Then the statistical process is performed against the difference by the statistical processing section, and the result is obtained.

With such configuration, the statistical process is performed against the differential data after extracting the difference between related document data, therefore information can be retrieved with giving weight on the difference between a plurality of document data, and valuable information which was not utilized before can be utilized efficiently.

In the generation of the difference at the difference processing section, a configuration that is capable of extracting precisely only elements, which are not common between documents, as the difference is fine.

Such effect of the present invention can be expected as such the unique information in the difference can be extracted more effectively if the accuracy of the difference extraction becomes higher.

Here, the method of generating the difference to extract the readable sentence as the difference may deteriorate the extraction accuracy of the difference in exchange for the readability; there is no need to extract the readable sentence as the difference in this invention.

In the present invention, the extraction accuracy of the differential element is important but the readability of the difference is not necessary.

Additionally, a deference generation method, where important information is narrowed down in a predetermined specific view, does not suit for the difference generation method of the present invention. It may give influence on an evaluation of the statistics amount in text mining.

When associating elements in the element associating section, other than the above explained word association method, identical, similar, synonymous, or analogous words may be associated based on a synonymous dictionary.

In the above second exemplary embodiment and the third exemplary embodiment, employed is a configuration which extracts one having no corresponding element by the differential element extracting section after associating elements by the element associating section when extracting the differential element; instead of this, such configuration may be employed that extracts the element as the differential element in which the differential score is equal to or over a predetermined threshold after calculating the differential score with respect to each element as explained in the forth exemplary embodiment.

In the above third embodiment, the explained configuration is that when extracting the differential block having no correspondence, firstly the differential block that includes the differential element is being extracted in the differential block extraction section, the differential block having corresponding element is deleted, and then the differential block having no correspondence is extracted; but the differential block extraction section is not necessarily employed.

That is, the differential element and the corresponding element are, respectively, extracted by the differential element extracting section and the corresponding element extracting section, and the block which include the differential element but does not include the corresponding element is directly extracted from the original document data in the no corresponding differential block extraction section.

Further, in the third exemplary embodiment, the differential element extracting section and the differential block extracting section are not being employed, and against the corresponding element extracted in the corresponding element extracting section, the block which does not include the corresponding element may be extracted from the original document data as the differential block with no correspondence.

The present invention is not limited to products configured by a hardware such as various logical elements, but processes of above steps may be performed by a computer which operates as each functional section explained in the above exemplary embodiment by installing a predetermined program in the computer having a CPU (Central Processing Section), a memory (memory device) and so on.

That is, a function of each functional section is achieved by configuring such that CPU and memory are arranged and functionality of the computer is provided, installing a predetermined program in the memory through communication means such as an internet, or a recording medium such as a CD-ROM, a memory card and so on, and running the CPU and so on by the installed program.

Explanations on the present invention have been made with reference to exemplary embodiments, but the present invention is not limited to the above exemplary embodiment. With respect to the configuration and details of the present invention, various modifications may be possible which person skilled in the art would be able to understand within the scope of the present invention.

The present application is the National Phase of PCT/JP2009/054300, filed Mar. 6, 2009, which claims priority based on the Japanese application tokugan 2008-062667 go which was filed 12 Mar. 2008, and all its disclosure is herein incorporated.

INDUSTRIAL APPLICABILITY

The present invention may be applied to text mining that focuses on the difference between related plural document data, for example, may be applied to text mining in which a plurality of opinions are collected against one object, and in which information is obtained from a plurality of channels such as an e-mail, a FAX, a telephone call More specifically, text mining that analyzes plural free-description questionnaires against a specific subject, and text mining that analyzes the telephone call voice record and the report document at the call center would be cited as examples.

The invention claimed is:

1. A text mining device including a central processing unit (CPU) comprising:
   a first processor portion which includes an element extracting unit that extracts language elements from respective document data included in a pair of document data that comprises first document data and second document data related to the first document data, a plurality of the pair of document data being input to the element extracting unit;
   a second processor portion which includes a differential processing unit that extracts an element extracted from a description part of the first document data by the element extracting unit as a differential element, and outputs a set of the differential elements as a difference set, said description part of the first document data being related to a content that is not included in the second document data; and
   a third processor portion which includes a statistical processing unit that performs a text mining process including a process in which a degree of characteristic of the differential element against the respective differential elements included in the difference set is statistically calculated, a plurality of said difference being input to the statistical processing unit.

2. The text mining device according to claim 1, wherein the element extracting unit extracts one or more of a character line in the document data, a word, a character N-gram, a word N-gram, a sentence structure, a partial structure of the sentence structure, and a sentence, as said element.

3. The text mining device according to claim 2, wherein the differential processing unit comprises:
   a differential score calculating unit that calculates a differential score indicating a likelihood in which the element extracted from the first document data by the element extracting unit is an element extracted from the description part that relates to a content that is not included in the second document data; and
   a differential element extracting unit that extracts the element having the differential score equal to or over a predetermined threshold as a differential element from the elements extracted from the first document data by the element extracting unit.

4. The text mining device according to claim 3, wherein the differential processing unit further comprises a differential block extracting unit that extracts a block, which includes the differential element extracted by the differential element extracting unit and comprises an element larger than the differential element, as a differential block from the document data.

5. The text mining device according to claim 4, wherein the differential block extracting unit extracts the block on a sentence structure basis or a partial structure of the sentence structure basis.

6. The text mining device according to claim 1, wherein the differential processing unit further comprises:
   an element associating unit that associates respective elements which are in identical, similar, synonymous, or analogous relation by comparing the elements of the document data between the first and second document data;
   a differential element extracting unit that extracts an element with no corresponding element of a pair in the association by the element association unit; and
   a differential block extracting unit that extracts a block of the element that does not include the corresponding element extracted by the corresponding element extracting unit from the document data as a differential block.

7. The text mining device according to claim 3, wherein the differential score calculating unit calculates the differential score based on an inverse number of an exponent function including a mutual information quantity of the element of the first document data and the element of the second document data as a parameter.

8. A text mining method comprising:
   extracting language elements from respective document data included in a pair of document data that comprises first document data and second document data related to the first document data;
   extracting an element extracted from a description part of the first document data as a differential element, said description part of the first document data being related to a content that is not included in the second document data;
   outputting a set of the differential elements as a difference set; and
   performing a text mining process including a process in which a degree of characteristic of the differential element against the respective differential elements included in the difference set is statistically calculated.

9. A non-transitory computer readable medium recording a text mining program for causing a computer to function as:
   an element extracting unit that extracts language elements from respective document data included in a pair of document data that comprises first document data and second document data related to the first document data, a plurality of the pair of document data being input to the element extracting unit;

a differential processing unit that extracts an element extracted from a description part of the first document data by the element extracting unit as a differential element, and outputs a set of the differential elements as a difference set, said description part of the first document data being related to a content that is not included in the second document data; and a statistical processing unit that performs a text mining process including a process in which a degree of characteristic of the differential element against the respective differential elements included in the difference is statistically calculated, a plurality of said difference set being input to the statistical processing unit.

10. The text mining device according to claim 3, wherein the differential element extracting unit extracts the element, not included in the second document data and has the differential score against the second document data which is equal to or over the predetermined threshold, as the differential element from the elements extracted from the first document data by the element extracting unit.

11. The text mining device according to claim 3, wherein the statistical processing unit further comprises a characteristic degree calculating unit that calculates a degree of characteristic of the differential elements in the difference set extracted from predetermined pieces of the first document data as a characteristic degree of the differential element, against respective differential elements included in the plurality of the difference set, the characteristic degree calculating unit calculating the characteristic degree in accordance with the differential score of the differential element.

12. The text mining device according to claim 11, wherein the characteristic degree calculating unit calculates based on a summation of the differential score of the differential elements in the difference set extracted from the plurality of the first document data and a summation of the differential score of the differential elements in the difference set extracted from predetermined pieces of first document data, when calculating the characteristic degree of the differential element against each differential element included in the difference set.

13. The text mining device according to claim 2, wherein the differential processing unit further comprises a differential block extracting unit that extracts, from the document data, a block, which includes the differential element extracted by the differential element extracting unit and comprises an element larger than the differential element, as a differential block, and the differential processing unit extracts a plurality of the differential block from the document data.

14. The text mining device according to claim 13, wherein the differential block extracting unit extracts the plurality of the differential block on a sentence structure basis, a partial structure of the sentence structure basis or a sentence basis.

15. The text mining method according to claim 8, wherein outputting the difference set comprises:

calculating a differential score indicating a likelihood in which the element extracted from the first document data by the element extracting unit is an element extracted from the description part that relates to a content that is not included in the second document data;

extracting the element having the differential score equal to or over a predetermined threshold as a differential element from the elements extracted from the first document data by the element extracting unit; and outputting the set of the differential elements as the difference set.

16. The text mining method according to claim 15, wherein performing the text mining process including the process in which the degree of characteristic of the differential element included in said difference set is statistically calculated comprises:

calculating a degree of characteristic of the differential elements in the difference set extracted from predetermined pieces of the first document data as a characteristic degree of the differential element, against respective differential elements included in the difference set; and calculating the characteristic degree in accordance with the differential score of the differential element.

17. The non-transitory computer readable medium according to claim 9, wherein the differential processing unit comprises:

a differential score calculating unit that calculates a differential score indicating a likelihood in which the element extracted from the first document data by the element extracting unit is an element extracted from the description part that relates to a content that is not included in the second document data; and a differential element extracting unit that extracts the element having the differential score equal to or over a predetermined threshold as a differential element from the elements extracted from the first document data by the element extracting unit.

18. The non-transitory computer readable medium according to claim 17, wherein the statistical processing unit further comprises a characteristic degree calculating unit that calculates a degree of characteristic of the differential elements in the difference set extracted from predetermined pieces of the first document data as a characteristic degree of the differential element, against respective differential elements included in the difference set, the characteristic degree calculating unit calculating the characteristic degree in accordance with the differential score of the differential element.

* * * * *